United States Patent Office 3,062,889
Patented Nov. 6, 1962

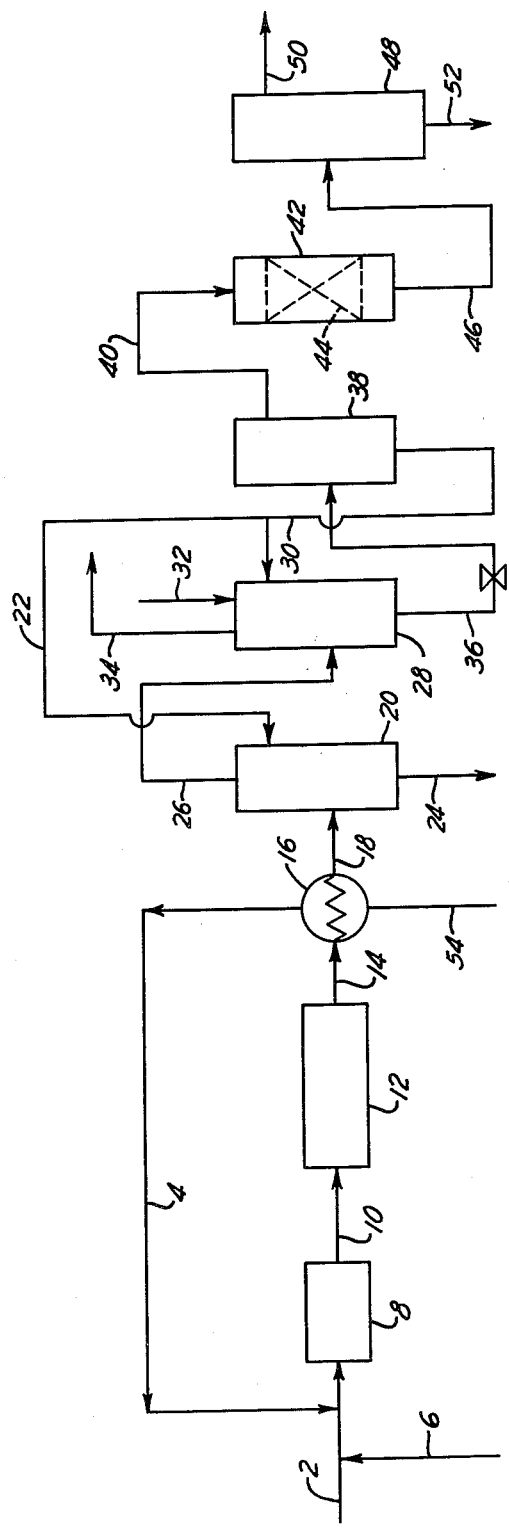

3,062,889
PROCESS FOR PURIFYING ACETALDEHYDE
Clarence R. Murphy, Allison Park, Pa., assignor to Gulf Research & Development Company, Pittsburgh, Pa., a corporation of Delaware
Filed June 22, 1959, Ser. No. 822,138
4 Claims. (Cl. 260—601)

This invention relates to a process for purifying acetaldehyde and more particularly to a process for purifying acetaldehyde obtained as a result of the partial oxidation of normally gaseous hydrocarbons such as propane.

The partial oxidation of normally gaseous hydrocarbons results in an oxygenated mixture comprising formaldehyde, acetaldehyde, methanol and higher alcohols, formals and ethylene and propylene oxides. The formaldehyde is generally first separated from the oxygenated mixture and the remainder of the oxygenated mixture is then treated with phosphoric acid in order to hydrolyze the ethylene and propylene oxides and thereby facilitate the separation and recovery of the desired acetaldehyde product. Unfortunately the formals which were produced as a result of the reaction between the formaldehyde and the higher alcohols, and which are present in the formaldehyde-free product, will decompose in the presence of phosphoric acid to produce the high molecular weight alcohol and formaldehyde. The formaldehyde so produced will react with the methanol present to form methylal $[CH_2(OCH_3)_2]$. Since a relatively large amount of methanol is present the methylal will not reverse to form methanol and formaldehyde. The formal present in the formaldehyde-free product can not easily be distilled away from the alcohol admixed therewith. Since the total formaldehyde-free product can not therefore advantageously be treated with phosphoric acid, it has been customary in the past to separate the total alcohol product containing the formal therefrom and treat the remainder of said product with phosphoric acid to hydrolyze the ethylene and propylene oxides to the corresponding glycols. The glycols are thereafter easily separated from the treated mixture and a purified acetaldehyde is thus obtained.

I have found that the product obtained from the partial oxidation of normally gaseous hydrocarbons from which formaldehyde has been removed but which still contains in admixture therewith acetaldehyde, methanol and higher alcohols, formals and ethylene and propylene oxides, can be treated with a cationic ion exchange resin to convert said olefin oxides to the corresponding glycols without decomposing or otherwise adversely affecting said formals associated therewith. The separation of alcohols, formals and olefin oxides from the acetaldehyde and the purification thereof is thereby facilitated.

The present invention can further be illustrated by reference to the accompanying flow diagram which is hereby incorporated in the present specification.

Referring to the flow diagram a normally gaseous hydrocarbon such as ethane, propane, and butane, or mixtures thereof, is introduced into the system by line 2, recycled normally gaseous hydrocarbon by line 4 and oxygen by line 6. The resultant mixture is generally at a temperature of about 600° to about 650° F. and a pressure of about 100 to about 150 pounds per square inch gauge. Based on such temperature and pressure, the resultant mixture will contain about 70 to about 96 volume percent of normally gaseous hydrocarbon and about 2 to about 4 volume percent of oxygen. The remainder, if any, will include carbon monoxide, carbon dioxide, nitrogen or other inert material.

The resultant mixture is charged to preheater 8 wherein said mixture in about 0.1 to about 2 seconds is raised to a temperature of about 650° to about 700° F. The heated mixture is removed from preheater 8 by line 10 and passed to reactor 12 wherein the mixture is reacted at a temperature of about 750° to about 850° F. and a pressure of about 100 to about 150 pounds per square inch gauge for about 0.1 to about 2 seconds. The partial oxidation product obtained in oxidation reactor 12 is removed therefrom by line 14 and within about 0.1 to about 2 seconds is cooled to a temperature of about 250° to about 400° F. and a pressure of about 100 to about 150 pounds per square inch gauge by any suitable means, for example by passage through heat exchanger 16 in indirect relationship with recycle hydrocarbon gas passing therethrough from line 54 on its way to line 4.

From heat exchanger 16 the partial oxidation product, including unoxidized gaseous hydrocarbon, is passed by line 18 to extractor 20 which is maintained at a temperature of about 120° to about 200° F. and a pressure of about 100 to about 150 pounds per square inch gauge. Water is introduced therein by line 22. Water containing the absorbed formaldehyde is removed from the base of extractor 20 by line 24 and passed to suitable recovery means to obtain the desired formaldehyde. The remainder of the product is removed overhead from extractor 20 by line 26 and passed to extractor 28 which is maintained at a temperature of about 80° to about 120° F. and a pressure of about 100 to about 150 pounds per square inch gauge. Recycled water containing some absorbed formaldehyde is introduced into extractor 28 by line 30, a portion of which forms the supply for line 22, and fresh make-up water by line 32. Unreacted gaseous hydrocarbon is removed overhead from extractor 28 by line 34 and can be recycled directly, or after any suitable treatment, to line 54.

The product removed from the base of extractor 28 is passed by line 36 through a pressure relief valve to tower 38 which can be maintained at a top temperature of about 150° to about 250° F. and a pressure of about 0 to about 30 pounds per square inch gauge. Water containing some absorbed formaldehyde is removed from the base of tower 38 by line 30 and recycled by the designated lines to extractors 20 and 28.

The total product remaining, including acetaldehyde, methanol, $C_2$ to $C_4$ alcohols, formals and ethylene and propylene oxides, and water which was not removed in tower 38, is removed from tower 38 by line 40 and passed to chamber 42 to convert the olefin oxides in said product to the corresponding glycols. A typical composition of such product is as follows:

| Product: | Percent by weight |
|---|---|
| Acetaldehyde | 25.0 to 35.0 |
| Formals | 0.5 to 1.8 |
| Methanols | 10.0 to 45.0 |
| Ethylene oxide | 0.1 to 0.5 |
| Propylene oxide | 0.5 to 2.5 |
| $C_2$ to $C_4$ alcohols | 3.0 to 10.0 |
| Water | 60.9 to 5.2 |

A bed 44 of cation exchange resin is supported within chamber 42 for the purpose of converting the olefin oxides in the product to the corresponding glycols. Any cation exchange resin having an exchange capacity of about 3 to about 35, preferably about 25 to about 35, kilograins of $CaCO_3$ per cubic foot of resin is sufficient for such purpose. The cation exchange resins are ones having acidic components such as sulfonic, carboxylic, phosphonic, phosphonous and phenolic groups incorporated in the structure. Examples of such cation exchange resins which can be used are sulfonated polystyrene resins which may be cross-linked with other compounds such as divinyl benzene, phenol formaldehyde resins containing sulfonic groups, a carboxylic-type cation exchange prepared by incorporating maleic anhydride into a copolymer of styrene and divinylbenzene and then hydrolyzing the resulting product, sulfonated coal prepared by treating various bituminous coals with sulfur trioxide. Thus the following cation exchange resins, as more fully defined on page 13 of Encyclopedia of Chemical Technology, Volume 8, The Interscience Encyclopedia, Inc., New York, N.Y., can be employed: Amberlite IR–100, Amberlite IR–105, Dowex 30 (Nalcite MX), Duolite C–3, Wofatit P, Wofatit K, Wofatit KS, Zeo Karb, Zeo Rex, Amberlite IR–120, Dowex 50 (Nalcite HCR), Permutit Q, Alkalex, Amberlite IRC–50, Duolite CS–100, Permutit H, Wofatit C, etc. Anionic resins can not be employed in the present process, since they promote the aldol condensation reaction As a result of the contact of the olefin oxides with the cation exchange resins in the presence of water in chamber 42, the olefin oxides are hydrolyzed to the corresponding glycols. The moles of water needed for hydrolysis relative to the olefin oxide is at least about 1:1, preferably about 4:1 to 50:1 or higher. Since the amount of water in the product entering chamber 42 is ordinarily more than sufficient for the desired hydrolysis reaction, no need generally exists to add additional water therein.

The temperature in chamber 42 is critical and must be maintained between about 150° to about 230° F., preferably between about 170° to about 200° F. In the event chamber 42 is operated at a temperature in excess of about 230° F. the acetaldehyde will polymerize to a resin and plug the chamber. However, at temperatures below about 150° F. the acetaldeyhde has a tendency to form paraldehyde which at the low temperatures will not reconvert back to acetaldehyde. The pressure must be high enough to maintain the water in the liquid phase but no higher, since elevated pressures favor the polymerization of acetaldehydes. Although atmospheric pressure is preferred, the pressure can be about 0 to about 100 pounds per square inch gauge. A space velocity under such temperature and pressure conditions, based on the total feed to chamber 42, of about one to about 10, preferably about 3 to about 6, volumes of feed per volume of cation exchange resin per hour is adequate. In order to facilitate the passage of the liquid through cation exchange resin bed 44, the ratio of volume of cation exchange resin itself relative to the volume of chamber 42 which is occupied must be about one to about 2. Under such conditions the formals present in the liquid product are unaffected.

The product issuing from the base of chamber 42 by line 46, comprising acetaldehyde, methanol, formals, ethylene glycol, propylene glycol, etc., is passed to a fractionating tower 48 which is maintained at a top temperature of about 115° to about 140° F. and a pressure of about 20 to about 40 pounds per square inch. As a result thereof purified acetaldehyde is removed from tower 48 by line 50. The remainder of the treated product is removed from tower 48 by line 52 for further treatment for separation and recovery of any one or all of the compounds present.

The invention can further be illustrated by reference to the following example.

*Example I*

A mixture containing, in percent by weight, 31.0 percent acetaldehyde, 43.0 percent methanol, one percent ethylene oxide, 3.0 percent propylene oxide, 12.0 percent water (more than enough for the desired hydrolysis), 1.8 percent formals and 8.2 percent higher alcohols obtained as a result of the partial oxidation of propane, as more fully described hereinabove, and from which formaldehyde had been removed, was passed through a resin bed, 12 inches deep and one inch in diameter, consisting of 130 grams of Amberlite IR–120, which is sulfonated polystyrene, at a temperature of 200° F., a pressure of 30 pounds per square inch gauge and a liquid hourly space velocity of 6. The product obtained as a result of such operation consisted of the following, in percent by weight: 31.0 acetaldehyde, 43.0 methyl alcohol, 3.97 propylene glycol, 1.33 ethylene glycol, 1.8 formals, 8.2 higher alcohols and 10.7 water. It is apparent that the formals remained unaffected by the treatment. No plugging of the resin column was noted. 500 grams of this product was thereafter subjected to fractionation at a top temperature of 125° F. and a pressure of 30 pounds per square inch gauge and 146 grams of a purified acetaldehyde was obtained.

Obviously, many modifications and variations of the invention as hereinabove set forth, can be made without departing from the spirit and scope thereof, and therefore only such limitations should be imposed as are indicated in the appended claims.

I claim:

1. A process for recovering acetaldehyde from a mixture obtained as a result of the partial oxidation of a normally gaseous hydrocarbon and from which formaldehyde has been separated, the mixture containing essentially acetaldehyde, alcohol and small amounts of formals and olefin oxides which consists in the steps of contacting such mixture at a temperature of about 150° to about 230° F. with a cation exchange resin in the presence of water, the mols of water relative to said olefin oxides being at least about 1:1, whereby said olefin oxides are hydrolyzed to the corresponding glycols and said formals remain unaffected, and thereafter recovering acetaldehyde from the resulting mixture.

2. A process for recovering acetaldehyde from a mixture obtained as a result of the partial oxidation of a normally gaseous hydrocarbon and from which formaldehyde has been separated, the mixture containing essentially acetaldehyde, alcohol and small amounts of formals and olefin oxides which consists in the steps of contacting such mixture at a temperature of about 150° to about 230° F. with a cation exchange resin in the presence of water, the mols of water relative to said olefin oxides being at least about 1:1, whereby said olefin oxides are hydrolyzed to the corresponding glycols and said formals remain unaffected, and thereafter recovering acetaldehyde from the resulting mixture by subjecting the same to a temperature of about 115° to about 140° F.

3. A process for recovering acetaldehyde from a mixture obtained as a result of the partial oxidation of propane and from which formaldehyde has been separated, the mixture containing essentially acetaldehyde, alcohol and small amounts of formals and olefin oxides which consists in the steps of contacting such mixture at a temperature of about 150° to about 230° F. with a cation exchange resin in the presence of water, the mols of water relative to said olefin oxides being at least about 1:1, whereby said olefin oxides are hydrolyzed to the corresponding glycols and said formals remain unaffected, and thereafter recovering acetaldehyde from the resulting mixture.

4. A process for recovering acetaldehyde from a mixture obtained as a result of the partial oxidation of propane and from which formaldehyde has been separated, the mixture containing essentially acetaldehyde, alcohol and small amounts of formals and olefin oxides which consists in the steps of contacting such mixture at a temperature of about 150° to about 230° F. with a cation exchange resin in the presence of water, the mols of water relative to said olefin oxides being at least about 1:1, whereby said olefin oxides are hydrolyzed to the corresponding glycols and said formals remain unaffected, and thereafter recovering acetaldehyde from the resulting mixture by subjecting the same to a temperature of about 115° to about 140° F.

References Cited in the file of this patent

UNITED STATES PATENTS 2,707,165 MacLean et al. ........... Apr. 26, 1955
2,840,615 Stautzenberger ........... June 24, 1958

OTHER REFERENCES

Othmer et al.: Industrial and Engineering Chemistry, Vol. 50, No. 9 (1958), pages 1235–1244. (Copy in Lib.)

Reed et al.: Industrial and Engineering Chemistry, Vol. 48, No. 2 (1956), pages 205–208. 260–635(E). (Copy in Lib.)